(12) United States Patent
Maguire, Jr.

(10) Patent No.: US 7,587,747 B2
(45) Date of Patent: Sep. 8, 2009

(54) TELEPRESENCE METHOD AND APPARATUS FOR SIMULTANEOUS USE BY MULTIPLE ACTIVE/PASSIVE USERS

(76) Inventor: Francis J. Maguire, Jr., 88 Greenwood Dr., Southbury, CT (US) 06488

( * ) Notice: Subject to any disclaimer, the term of this patent is extended or adjusted under 35 U.S.C. 154(b) by 157 days.

(21) Appl. No.: 11/685,708

(22) Filed: Mar. 13, 2007

(65) Prior Publication Data
US 2007/0220434 A1 Sep. 20, 2007

Related U.S. Application Data

(62) Division of application No. 09/177,356, filed on Oct. 23, 1998, now Pat. No. 7,190,392.

(60) Provisional application No. 60/063,232, filed on Oct. 23, 1997.

(51) Int. Cl.
*H04N 7/173* (2006.01)

(52) U.S. Cl. ............... 725/133; 725/32; 725/34; 725/35; 725/36; 725/141; 725/153; 348/113; 348/114; 348/115; 348/117; 348/121; 348/122; 348/123; 348/47; 348/48; 348/143; 348/157; 348/159; 434/34; 434/35; 434/42; 434/43; 434/44; 434/365; 463/36; 463/40; 345/4; 345/5; 345/7; 345/8; 345/30; 345/31; 345/110

(58) Field of Classification Search ......... 348/113–115, 348/117, 119, 121–124, 47–48, 143, 157, 348/159; 434/34–35, 42–44, 365; 463/36, 463/40; 725/32, 34–36, 133, 141, 153; 345/4–5, 345/7–8, 30–31, 110
See application file for complete search history.

(56) References Cited

U.S. PATENT DOCUMENTS

| 2,955,156 | A | 10/1960 | Heilig |
| 3,050,870 | A | 8/1962 | Heilig |
| 3,916,094 | A | 10/1975 | Marrone |
| 4,181,408 | A | 1/1980 | Senders |
| 4,300,818 | A | 11/1981 | Schachar |
| 4,303,394 | A | 12/1981 | Berke et al. |
| 4,402,580 | A | 9/1983 | Ross |
| 4,405,943 | A | 9/1983 | Kanaly |

(Continued)

FOREIGN PATENT DOCUMENTS

EP  670661  9/1995

(Continued)

OTHER PUBLICATIONS

"The Telepresence Mobile Robot System," Telepresence Research, Inc., Feb. 20, 1995, pp. 1-3.

(Continued)

*Primary Examiner*—Jason P Salce

(57) ABSTRACT

A telepresence server is for connection to a telecommunications network for providing access to a reality engine for a plurality of passive users. The reality engine can be controlled by an active user or a professional director through the network or by a local professional director. Active/passive mode displays can be used by the passive users in a passive mode and an active/passive mode display can be used by the active user in an active mode.

20 Claims, 8 Drawing Sheets

U.S. PATENT DOCUMENTS

| | | |
|---|---|---|
| 4,591,120 A | 5/1986 | Bryant-Jeffries et al. |
| 4,672,438 A | 6/1987 | Plante et al. |
| 4,753,173 A | 6/1988 | James |
| 4,757,380 A | 7/1988 | Smets et al. |
| 4,796,842 A | 1/1989 | Hamada et al. |
| 4,836,486 A | 6/1989 | Vossoughi et al. |
| 4,866,229 A | 9/1989 | Scharfenberg |
| 4,879,849 A | 11/1989 | Hollingsworth, III et al. |
| 4,918,473 A | 4/1990 | Blackshear |
| 4,968,123 A | 11/1990 | Fournier, Jr. et al. |
| 4,970,589 A | 11/1990 | Hanson et al. |
| 5,040,055 A | 8/1991 | Smith |
| 5,124,805 A | 6/1992 | Chung et al. |
| 5,153,716 A | 10/1992 | Smith |
| 5,252,070 A | 10/1993 | Jarrett |
| 5,257,094 A | 10/1993 | LaRussa |
| 5,267,708 A | 12/1993 | Monson et al. |
| 5,320,534 A | 6/1994 | Thomas |
| 5,365,218 A | 11/1994 | Otto |
| 5,397,133 A | 3/1995 | Penzias |
| 5,414,461 A | 5/1995 | Kishi et al. |
| 5,422,653 A | 6/1995 | Maguire, Jr. |
| 5,436,542 A | 7/1995 | Petelin et al. |
| 5,436,638 A | 7/1995 | Bolas et al. |
| 5,444,476 A | 8/1995 | Conway |
| 5,566,370 A | 10/1996 | Young |
| 5,572,229 A | 11/1996 | Fisher |
| 5,577,981 A | 11/1996 | Jarvik |
| 5,584,696 A | 12/1996 | Walker et al. |
| 5,615,132 A | 3/1997 | Horton et al. |
| 5,625,410 A | 4/1997 | Washino et al. |
| 5,634,622 A | 6/1997 | Pye |
| 5,644,324 A | 7/1997 | Maguire, Jr. |
| 5,646,677 A | 7/1997 | Reber |
| 5,662,523 A | 9/1997 | Yasumaru et al. |
| 5,684,531 A | 11/1997 | Li et al. |
| 5,734,421 A | 3/1998 | Maguire, Jr. |
| 5,737,012 A | 4/1998 | Tabata et al. |
| 5,745,126 A | 4/1998 | Jain et al. |
| 5,767,820 A | 6/1998 | Bassett et al. |
| 5,812,257 A | 9/1998 | Teitel et al. |
| 5,850,352 A | 12/1998 | Moezzi et al. |
| 5,867,210 A | 2/1999 | Rod |
| 5,895,021 A | 4/1999 | Rosenband et al. |
| 5,900,849 A | 5/1999 | Gallery |
| 6,008,837 A | 12/1999 | Yonezawa |
| 6,020,885 A | 2/2000 | Honda |
| 6,027,257 A | 2/2000 | Richards et al. |
| 6,046,712 A | 4/2000 | Beller et al. |
| 6,084,979 A | 7/2000 | Kanade et al. |
| 6,133,941 A | 10/2000 | Ono |
| 6,133,944 A | 10/2000 | Braun et al. |
| 6,181,371 B1 | 1/2001 | Maguire, Jr. |
| 6,185,737 B1 | 2/2001 | Northcutt et al. |
| 6,208,376 B1 | 3/2001 | Tanaka et al. |
| 6,208,379 B1 | 3/2001 | Oya et al. |
| 6,252,989 B1 | 6/2001 | Geisler et al. |
| 6,288,891 B1 | 9/2001 | Hasegawa et al. |
| 6,380,972 B1 | 4/2002 | Suga et al. |
| 6,396,462 B1 | 5/2002 | Mead, Jr. et al. |
| 6,414,716 B1 | 7/2002 | Kawai |
| 6,470,498 B1 | 10/2002 | Reber et al. |
| 6,556,241 B1 | 4/2003 | Yoshimura et al. |
| 6,611,285 B1 * | 8/2003 | Morita .................... 348/211.3 |

FOREIGN PATENT DOCUMENTS

| | | |
|---|---|---|
| GB | 2286311 | 8/1995 |
| JP | 3-292093 | 12/1991 |

OTHER PUBLICATIONS

"Virtual Brewery Adventure," Telepresence Research, Inc., Feb. 20, 1995, pp. 1-3.

Neveu et al, "The Virtual Lens," Presence, Aug. 1998, pp. 370-381, vol. 7, No. 4.

Sutherland, "A head-mounted three dimensional display," Fall Joint Computer Conference, 1968, pp. 757-763.

EscheR: Etl Stereo Compact Head for Robot vision, Electrotechnical Laboratory Real World Computing Partnership, Mar. 3, 1996, pp. 1-3.

Pretlove, J., "Development of a Steroscopic Telepresence system," Mechatronic Systems and Robotics Research Group, University of Surrey, Jul. 2, 1997, pp. 1-2.

"TO40 4-Axis Stereo-Vision Head," Robosoft Technoploe d'Izarbel F-64210 Bidart, France, Dec. 1997, pp. 1-2.

"Vision Components," HelpMate Robotics Research Toolkits, BiSight/UniSight Vision Platform, Danbury, Connecticut, Aug. 21, 1998, pp. 1-5.

Kenmochi Nobohiko, "Three-Dimensional Display Device," Patent Abstracts of Japan, JP Pub. No. 03-292093, Dec. 24, 1991, one page.

SeeCoast Manufacturing Company, Inc, coin and non-coin operated telescopes and binoculars, started in 1960, pp. 1-3.

Hi-Spy Viewing Machines, coin and non-coin operated binoculars/telescopes, since 1991, pp. 1-10.

* cited by examiner

US 7,587,747 B2

TELEPRESENCE METHOD AND APPARATUS FOR SIMULTANEOUS USE BY MULTIPLE ACTIVE/PASSIVE USERS

CROSS REFERENCE TO RELATED APPLICATIONS

The present application is a divisional of U.S. patent application Ser. No. 09/177,356 filed Oct. 23, 1998 now U.S. Pat. No. 7,190,392 and which claims priority from U.S. Provisional Application Ser. No. 60/063,232 filed Oct. 23, 1997.

BACKGROUND OF THE INVENTION

1. Field of the Invention

The invention relates to communication of images and, more particularly, to telepresence, including remote video monitoring.

2. Discussion of Related Art

Remote monitoring systems are known to include remotely located video cameras positioned for monitoring from a remote site with a personal computer or display. Such can be connected by any kind of connection such as point-to-point with a telephone line, via the internet or through an internet hub. A video server is used to capture successive real time images from a video camera, digitize and compress them and transfer them frame-by-frame through the internet, intranet or point-to-point protocol direct dial-in connection.

Telepresence is similar in concept to "virtual reality" except images and other stimuli are provided to the user via a connection in a telecommunications network. One approach uses a teleoperated camera platform coupled to the head movements of a remote user wearing a head-tracked, head-mounted display (HTHMD). See U.S. Pat. No. 5,436,638 at column 1, lines 43-48 and column 3, lines 10-31. Instead of a HTHMD, a desktop display can be yoked to the movements of a user seated before the display such as shown in FIGS. 13, 14A, 14B and 16 of U.S. Pat. No. 5,436,638. See also the PUSH desktop display and the BOOM3C head-coupled stereoscopic display, either hand-guided or hands-free (head-guided), of Fakespace, Inc., Menlo Park, Calif. Another approach is to use a remote reality engine with prerecorded scenarios for selection over the network according to monitored movements of the user. Due to the limited bandwidth typically available for such connections, the rate of frame delivery is very slow and therefore there is a noticeable lag between the time of image capture or retrieval and display. Moreover, the amount of video information conveyed is rather limited since the technology is based on the existing NTSC infrastructure. Consequently, the above described applications for telepresence tend to be lacking in the "presence" aspect and likewise remote viewing tends to be confined to rather static, e.g., industrial plant process monitoring, employee parking lot monitoring, security monitoring for plant ingress/egress and the like.

However, various competing transport technologies are now being deployed to increased the bandwidth enormously and thereby speed up such connections. These include optical fiber networks, cable, satellite and techniques to utilize the existing telephony infrastructure of twisted copper pairs as digital subscribers lines. Included in the services deliverable on the links provided according to such technologies will be HDTV. While the bandwidth of such links now being deployed to subscribers can be heavily proportioned in the downstream direction, they also provide at least a significant amount of upstream bandwidth. As a result, there will now be new opportunities for far more dynamic types of telepresence applications, including remote video monitoring, particularly on the Internet, and in ways heretofore never even contemplated. In particular, it can be foreseen that there will be extremely high demand for exciting, new telepresence application.

Unfortunately, these telepresence applications suffer from an underlying assumption borrowed from the art of "virtual reality" where the user is enabled to navigate within a virtual environment in a highly autonomous manner. The user takes command of the virtual environment and actively controls all of the responses of the reality engine according to monitored activity of the user. This dedication to a single user of the tools needed to generate the virtual environment makes the reality engine unavailable to all but this one user at a given time. A similar situation exists for a remotely located video camera. Since these tools are quite expensive, the cost of use for the single user is high. Hence the anticipated demand cannot be efficiently and economically met.

SUMMARY OF THE INVENTION

As object of the present invention is to provide a new type of telepresence, including remote monitoring, that takes advantage of the increased bandwidth on links now being deployed.

Another object of the present invention is to provide telepresence to more than one user at a given time.

According to a first aspect of the present invention, a system for providing video images, comprises a video camera for providing video signals indicative of said video images captured by said video camera, a first display, responsive to said video signals, for providing said video images for viewing by a first user, an n-axis sensor, responsive to n-axis first display motions caused by said first user, for providing an n-axis attitude control signal, an n-axis platform having said video camera mounted thereon, responsive to said n-axis attitude command signal, for executing n-axis platform motions emulative of said n-axis first display motions, and one or more second displays, responsive to said video signals, for providing said video images for viewing by one or more corresponding second users and responsive to said n-axis attitude command signal for executing n-axis second display motions emulative of said n-axis first display motions.

According to a second aspect of the present invention, a system comprises at least one reality engine for providing an image signal indicative of images taken from various attitudes, and a telepresence server, responsive to said image signal, for providing said image signal and an attitude control signal to at least one attitudinally actuatable display via a telecommunications network for attitudinally actuating said display for guiding a viewing attitude of a user and for displaying said images for said user of said at least one attitudinally actuatable display for passively viewing said images from said various attitudes. The telepresence server can be for providing access to said reality engine for an active user of a display attitudinally actuatable by said active user for providing said attitude control signal to said reality engine and to said telepresence server wherein the user is drawn from the general public with no special training. Or, the telepresence server can be for providing access to said reality engine for a trained director who can be local, not needing network access to the server, or remote, needing to access via a network.

According to a third aspect of the present invention, a display device comprises an n-axis display platform, responsive in a passive mode to an attitudinal control signal, for guiding a user's head to execute attitudinal movements, and responsive in an active mode to attitudinal movements of a user's head for providing sensed signals indicative of said attitudinal movements, and a display connected to said n-axis display platform, responsive to a video signal, for displaying images corresponding to said attitudinal movements.

These and other objects, features and advantages of the present invention will become more apparent in light of the following detailed description of a best mode embodiment thereof, as illustrated in the accompanying drawing.

DETAILED DESCRIPTION OF EMBODIMENTS

Figure 1:
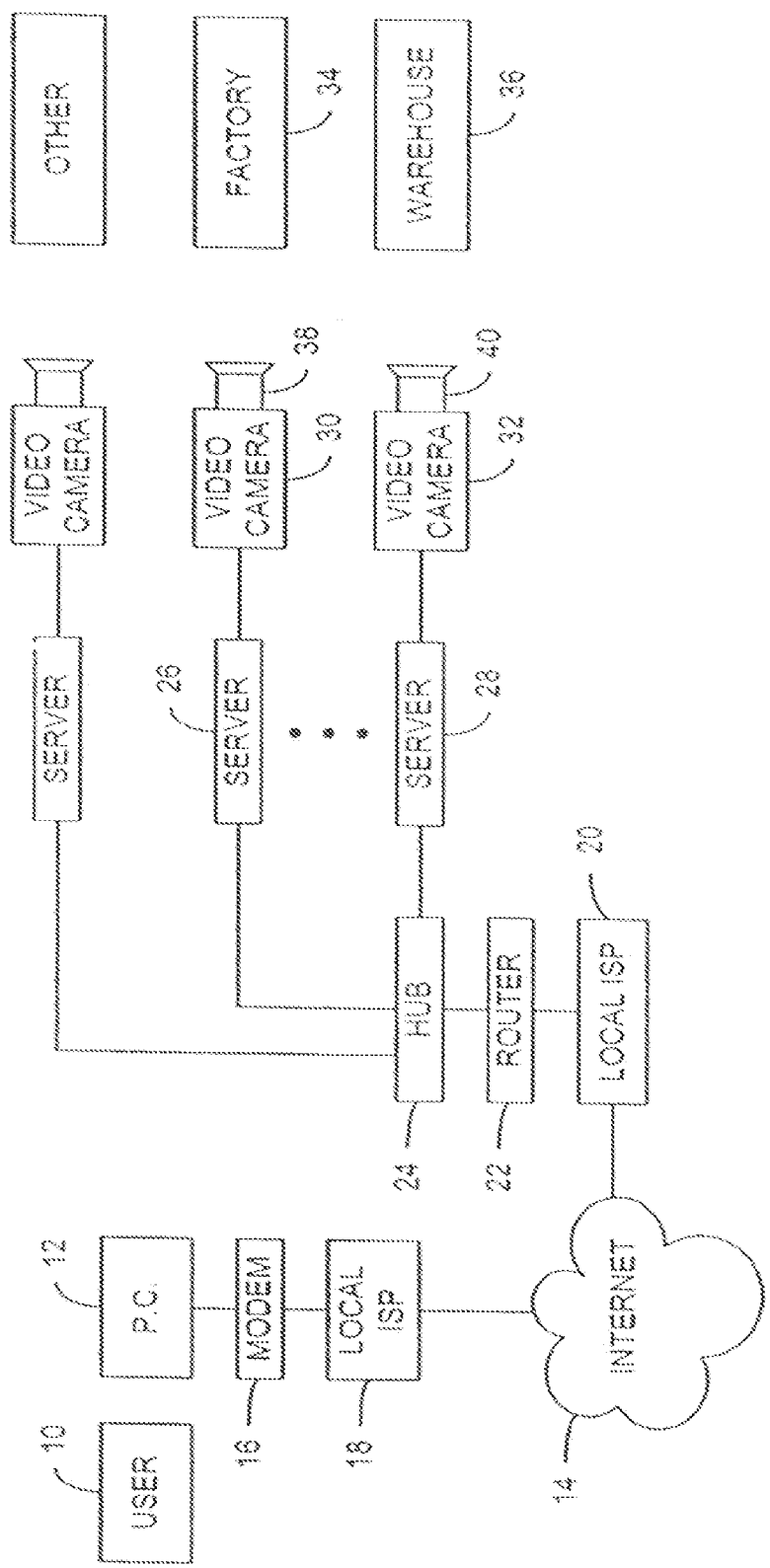
FIG. 1 shows a prior art remote monitoring application.

FIG. 1 shows a prior art internet remote video monitoring application where a user 10 of a personal computer (PC) 12 can access the internet 14 via a modem 16 and a local internet service provider (ISP) 18. Another service provider 20 is connected via a router 22 and a hub 24 to a plurality of video servers 26, . . . , 28 which are in turn connected to a plurality of video cameras 30, . . . , 32. The cameras can be located in different parts of an industrial plant such as the factory 34 and the warehouse 36. In this way the user 10 can monitor various parts of the plant remotely. It is even possible to remotely control the camera, e.g., by controlling their lenses 38, 40 to zoom in and out. It should be realized, however, that the camera or cameras can be located anywhere and that the internet 14 can be any kind of connection or connections provided that bidirectionality is provided.

Given the typical bandwidth limitations of existing methods, such as methods for accessing the internet and other similar connections, this way of remote video monitoring has been found to be effective for rather static type applications such as security monitoring. E.g., a security officer sits before a PC or other display (or bank or displays) and monitors the desired points in various plants of a company from a single remote monitoring site. For this sort of application, a need for a large amount of bandwidth is not particularly important and hence the proven success of such relatively static applications. On the other hand, more dynamic remote video monitoring applications, such as entertainment or education, cannot be expected to be viable using such limited bandwidth connections.

Figure 2:
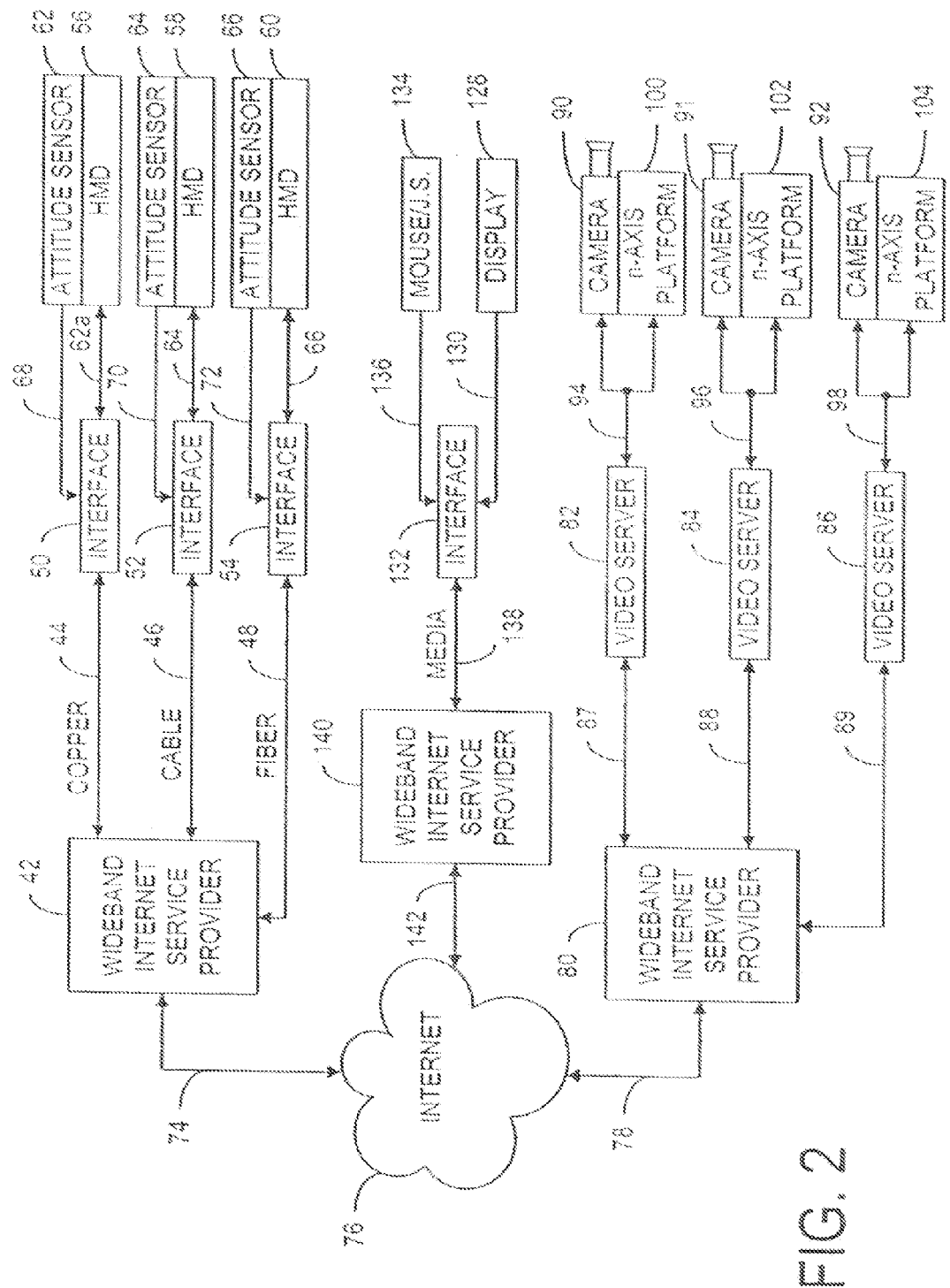
FIG. 2 shows plural cameras mounted on corresponding n-axis platforms for being moved in an n-axis manner to monitor remote sites under the control of corresponding plural remote viewers each using a display such as a head mounted display having its attitude and/or position monitored in a corresponding n-axis manner.

Telepresence concepts are shown implemented in FIG. 2 in a wideband network. A wideband internet service provider (WISP) 42 is shown connected to a plurality of displays for users at different geographical locations. The WISP 42 may be owned by a local telephone or cable TV company, for example, and can provide broadband services on any of the competing media illustrated such as a copper pair 44, coaxial cable 46, an optical fiber 48, or equivalents such as wireless including satellite communications. Each of these will deploy their own peculiar subscriber interfaces 50, 52, 54 respectively. For instance, the twisted copper pair may be used as an Asymmetric Digital Subscriber Line (ADSL) using, e.g., Discrete MultiTone (DMT), Carrierless Amplitude Phase (CAP) modulation, or the like, and terminate with an interface 50 comprising an ADSL modem. Of course, other types of so-called xDSL technologies can be used as well. These include but are not limited to IDSL (ISDN DSL), HDSL (High-bit-rate DSL), SDSL (Symmetric DSL), RADSL (Rate-Adaptive DSL), and VDSL (Very-high-rate DSL). On the other hand, the cable interface 52 might simply be a part of a set top converter, for example, also used for conventional television as modified for web access, e.g., by the WebTVNetworks unit of Microsoft, or by other providers such as Oracle Corp., Sun Microsystems Inc., Netscape Communications, General Instrument, Thomson SA, WorldGate Communications Inc., or the like. The fiber interface 54 might be an optical network unit (ONU) that converts downstream optical signals to electrical and formats them for a copper or cable connection to the subscriber and the reverse for upstream signals. The fiber 48 could also terminate in the user's premises. It should be mentioned that other delivery systems are possible as well, including LMDS. Similarly, the internet is presently being augmented to service increased bandwidth requirements.

Considering the enormously increased bandwidth provided by the WISP 42 e.g., 7 or 8 Mbit/sec compared to 33 kbit/sec for the modem 16 of FIG. 1, it is now possible to provide new and more dynamic functions for remote video monitoring. For instance, FIG. 2 shows Head Mounted Displays (HMDs) 56, 58, 60 for use by three different subscribers connected to the respective interfaces 50, 52, 54 by signal lines 62a, 64, 66 which can be bidirectional. Bidirectionality may be employed for conveying broadband video information downstream and command data upstream in a narrowband. The command data may be entered through a PC (not shown) or by means of input devices on the HMD itself, for example. It should be realized that the example of FIG. 2 does not exclude the coexistence of the possible transmission of wideband information, such as video, from the subscriber to the network as well, such as by using SDSL, mentioned above, or by making ADSL behave symmetrically although with a reduced downstream rate.

Various head mounted displays are known. One type is a see-through display where the real world view of the user is "augmented" with imagery from an image source, called "augmented reality". Another type completely blocks light from the outside and is for use in a completely virtual environment. Yet another type is a "video see-through" where the user wears stereo cameras on his head which provide images for perception of the surroundings using a head mounted display. All of these types of HMDs can be used to implement the present invention. However, many of these displays use bulky optics and related heavy cables which are somewhat burdensome. Moreover, presently available optics have a rather narrow field of view and present video image resolution is rather poor.

A particularly attractive recent innovation for the purposes of the present invention is the retinal display which does away with the external display and the associated optics entirely. There is no comparable problem with narrow field of view and low resolution with a retinal display. A retinal display has been disclosed for providing a scanning light signal for the formation of images firstly and directly in the eye of a viewer: U.S. Pat. No. 5,467,104 shows the projection of a modulated scanning light signal directly onto the retina of the viewer's eye without the prior formation of any real or aerial image outside the viewer's eye. In other words, light rays do not converge in any way outside the eye to form an image. That patent shows modulated photons of the light signal reflected from one or more scanners by way of projection optics directly onto the retina. A micromechanical scanner can be used as the scanning device, as shown in U.S. Pat. No. 5,557, 444 (based on U.S. patent application Ser. No. 08/329,508, filed Oct. 26, 1994). An optical fiber may be used to provide the light signal from the photon source to the scanner as shown in U.S. Pat. No. 5,596,339 in order to promote a lightweight, head mounted, panoramic display.

In addition to the HMDs 56, 58, 60, a respective plurality of attitude sensors 62, 64, 66 are shown for mounting on the head of the user for sensing the rotational movements of the user's head and providing a sensed signal on a line 68, 70, 72, respectively, to interfaces 50, 52, 54 for upstream transmission. Such a device for determining orientation of a user's head using accelerometers is shown in U.S. Pat. No. 5,615, 132 to Horton et al. Another is shown in U.S. Pat. No. 5,645, 077 to Foxlin. Yet another is provided by Precision Navigation, Inc., 1235 Pear Avenue, Suite 111, Mountain View, Calif. 94043. For a simple case, it is assumed that translatory position (translation) of the user's head is not measured or, if measured, is ignored. A further simplification reduces the number of rotational degrees of freedom that are measured from three to two (e.g., pan (yaw) and tilt (pitch) as described below), or even just one. This simplification does exclude the measurement of translations, however. The WISP 42 is connected by a signal on a line 74 and via the internet 76 and a signal on a line 78 to another WISP 80 connected in turn to a plurality of video servers 82, 84 86 signals on lines 87, 88, 89. It should be realized that there need not be two separate WISP's 42, 80, but that in certain circumstances one can suffice. The video servers are connected to a corresponding plurality of cameras 90, 91, 92 by a plurality of signal lines 94, 96, 98. The cameras 90, 91, 92 send video signals via the internet 76 to the HMDs 56, 58, 60, respectively, for display.

In the opposite direction, the interfaces 50, 52, 54 transmit attitude command signals in response to the corresponding sensed attitude signals on the lines 68, 70, 72 from the attitude sensors 62, 64, 66 through the WISP 42, the internet 76, the WISP 80 and the plurality of video servers 82, 84, 86 to a corresponding plurality of n-axis platforms such as three axis platforms 100, 102, 104.

The platforms 100, 102, 104 need not be three-axis, i. e., including pitch, roll and yaw but may be restricted to only two axes (e. g., pitch and yaw) or even just one (e. g., yaw). For instance, if roll is omitted, a 2-axis platform in the form of a computer controlled pan-tilt (2-axis: yaw-pitch) unit, Model PTU-46-70 or PTU-46-17.5, produced by Directed Perception, Inc., 1485 Rollins Road, Burlingame, Calif. 94010 may be used. Actuators from other manufacturers such as Densitron may be used as well. In addition to one or more of the three attitudinal degrees of freedom, one or more of the three translational degrees of freedom may also be added in any desired combination. For example, a six degree of freedom platform could be provided.

Figure 3:
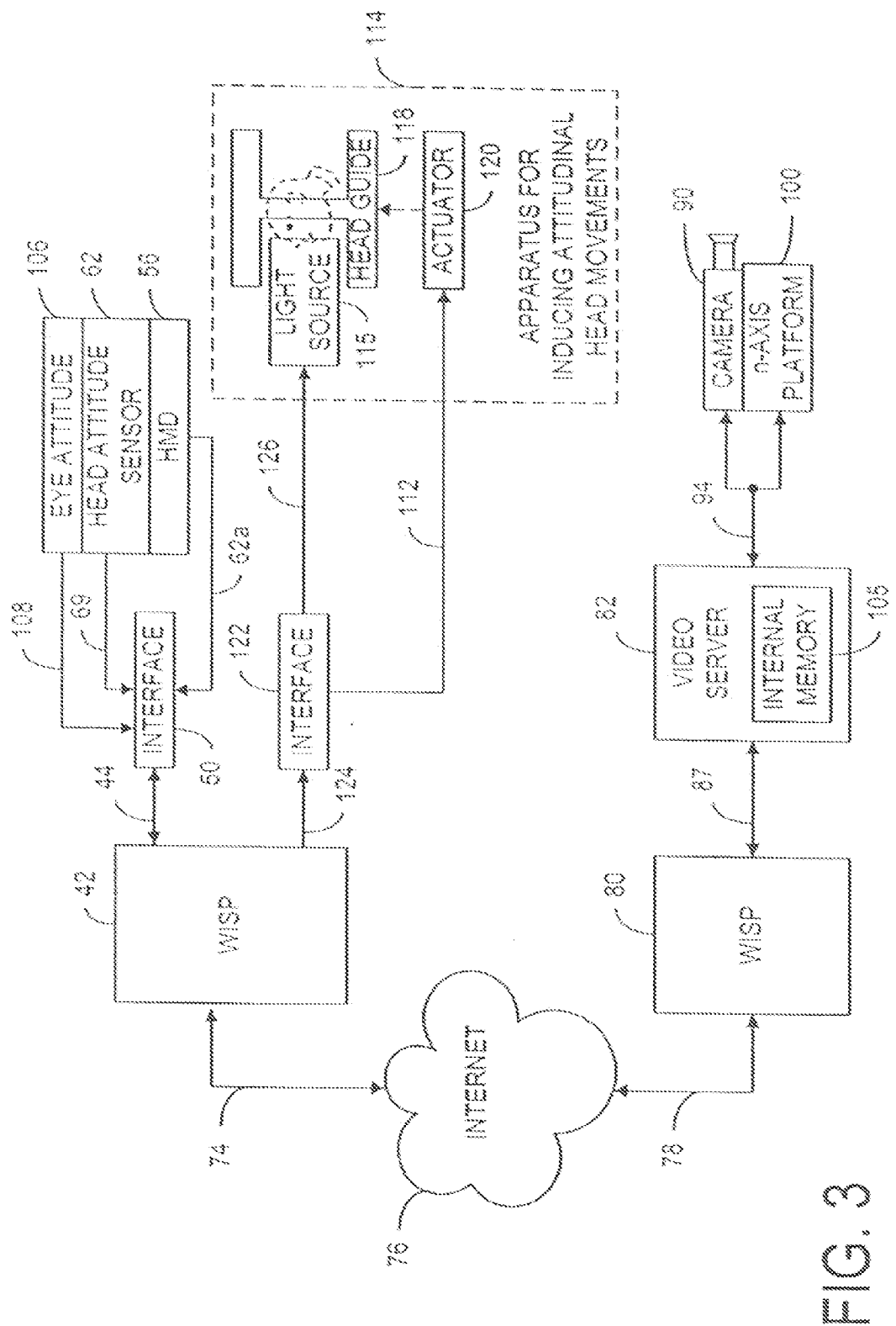
FIG. 3 illustrates that one or more of the remote viewers may be passive viewers whose attitudinal head movements are not monitored at all but rather are guided to emulate the attitudinal head movements of an active viewer.

While some of the attitudinal or positional degrees of freedom discussed above may be added or subtracted in a given application in different combinations, it should be realized that other degrees of freedom that are different in kind from those discussed above may also be added to an n-axis platform. For instance, the attitude sensor 62, as shown in FIG. 3, can be sensing 2-axes only, e. g., yaw (pan) and pitch (tilt) while an additional eye attitude sensor 106, as shown in FIG. 3 can be added for monitoring two degrees of freedom of the HMD 56 user's eyes. The eye sensor 1056 provides a sensed signal on a line 108 to the interface 50. In that case, a four-degree of freedom, i. e., 4-axis platform 100 would be appropriate. Two axes for emulating the pitch and yaw of the user's head and two axes for emulating the pitch and yaw of at least one of the user's eyes. A 4-axis platform ("The vision-head") for carrying out the above is shown by the ESCHeR high performance stereo-head at the following internet site provided by Rougeaux Sebastian:http//www.etl.go.jp/etl/robotics/Projec . . . 6/node4.html#SECTION00021000000000000000. See also http://www.etl.go.jp/etl/robotics/Projects/CogRobo/escher.html. Other camera motion platforms are available, for instance from Helpmate Robotics Inc., Shelter Rock Lane, Danbury, Conn. 06810-8159 under the product names BiSight/UniSight and Zebra at http://ntplx.net/~helpmate/. Another 4-axis Stereo-Vision Head (TO 40) can be obtained from Robosoft, Technopole d=Izarbel F-64210 Bidart, France at http://www.robosoft.fr.

Thus various combinations of monitoring of degrees-of-freedom of body parts can be used. Not only selected head and/or eye attitudinal degrees-of-freedom but also translatory (positional) degrees-of-freedom of the head can be monitored in one or more axes. These are altogether then emulated on the n-axis platform. Depending on the number of body parts and spatial motions thereof monitored, any correspondingly appropriate multi-axis positioning platform can be used. A platform based on those used for conventional flight-simulators but scaled down for a camera-sized application can be used. For instance, an even more scaled down version of the six degree of freedom principle demonstrated by the Polytec PI "Hexapod" can be used (Polytec PI, Inc., Suite 212, 23 Midstate Drive, Auburn, Mass. 01501 USA, the subsidiary of Physik Instruments (PI) GmbH & Co., and Polytec GmbH, both of Polytec-Platz 5-7,76337 Waldbronn, Germany).

It will now be more fully realized from the foregoing, as mentioned above, that there will now be new opportunities for far more dynamic types of telepresence applications, including remote video monitoring, particularly on the Internet, and in ways heretofore never even contemplated. In particular, it can be foreseen that there will be extremely high demand for exciting, new telepresence applications.

As also mentioned above, these telepresence applications suffer from an underlying assumption borrowed from the art of "virtual reality" where the user is enabled to navigate within a virtual environment in a highly autonomous manner. The user takes command of the virtual environment and actively controls all of the responses of the reality engine according to monitored activity of the user. This has been shown extended to a wideband network in FIG. 2. This dedication of the tools needed to generate the remote presence for a single user is quite expensive. A way to meet the anticipated high demand in an efficient and economical manner will now be shown.

According to the present invention, the remote monitoring carried out under the control of a remote active viewer using an HMD/attitude sensor 56, 62 combination, such as in FIG. 2, can be used to control not only a camera/n-axis platform 88, 100, but also one or more passive viewing platforms for use by one or more remote passive viewers. In other words, both "what" the passive viewers see, and the "attitude" in which they see same, are controlled by the active viewer. Further, for such embodiments, according to the teachings hereof, the passive viewing need not be contemporaneous with the image acquisition process, but may be delayed in time to any desired extent using a memory or other storage facility.

For instance, FIG. 3 shows that one or more of the remote viewers may be passive viewers whose attitudinal head movements are not monitored at all but rather are instead mechanically guided to emulate the attitudinal head movements of the active viewer whose head movements are monitored by the attitude sensor 62 such as already shown along with the HMD 56 in FIG. 2, which is also shown again in FIG. 3. Such a passive apparatus 114 is shown in FIG. 3 with a light source 115, e. g., such as the type of display used for an HMD 116 (shown in FIG. 4), mounted on a head guide 118 which may be an actuatable multi-axis platform which is in turn actuated by an actuator 120 under the control of an actuation signal on a line 112. Several examples of such display devices for such passive use is described in more detail in copending application Ser. No. 08/794,122 filed Feb. 3, 1997, now U.S. Pat. No. 6,181,371, and which is hereby incorporated by reference. The actuation signal on the line 112 is provided by an interface 122 that receives a signal on a line 124 from the WISP 42. An image signal is also provided on a line 126 from the interface 122 to the light source 115.

As shown in further detail in FIG. 4, if the light source 115 is part of an HMD 116, the is HMD may be optionally detachable along with the light source 115 from the head-guide 118 and, for that purpose, will also optionally include an attitude sensor 62b so that the HMD and light source while detached from the head guide may alternatively be used in a active way by the viewer as previously described in connection with FIG. 3. It should be realized that there need not be any HMD provided with the passive apparatus 114 and that the light source alone can be used with the head guide with or without the attitude sensor. If used with a sensor, the apparatus 114 could be built in the same way as the various devices shown in U.S. Pat. No. 5,436,638 except with actuators as well as sensors. For instance, the pivot 110 of FIG. 1 or the assembly 770 of FIG. 6 of Bolas et al could be actuated. It should also be realized, however, that such a light-source/head-guide combination can also be designed as a dual use active/passive display apparatus so the user can select to operate in either active or passive mode. The user will want to select active mode if the desired camera is not in use by anyone else. Or, if the desired camera is already in use, the user can select passive mode and the WISP 42 can then transmit the head attitude signals on the line 68 to both the n-axis camera platform 100 and to the apparatus 114 for actuating both the n-axis platform 100 and the apparatus 114 for emulating the attitudinal head motions of the user of the HMD 56.

Figure 4:
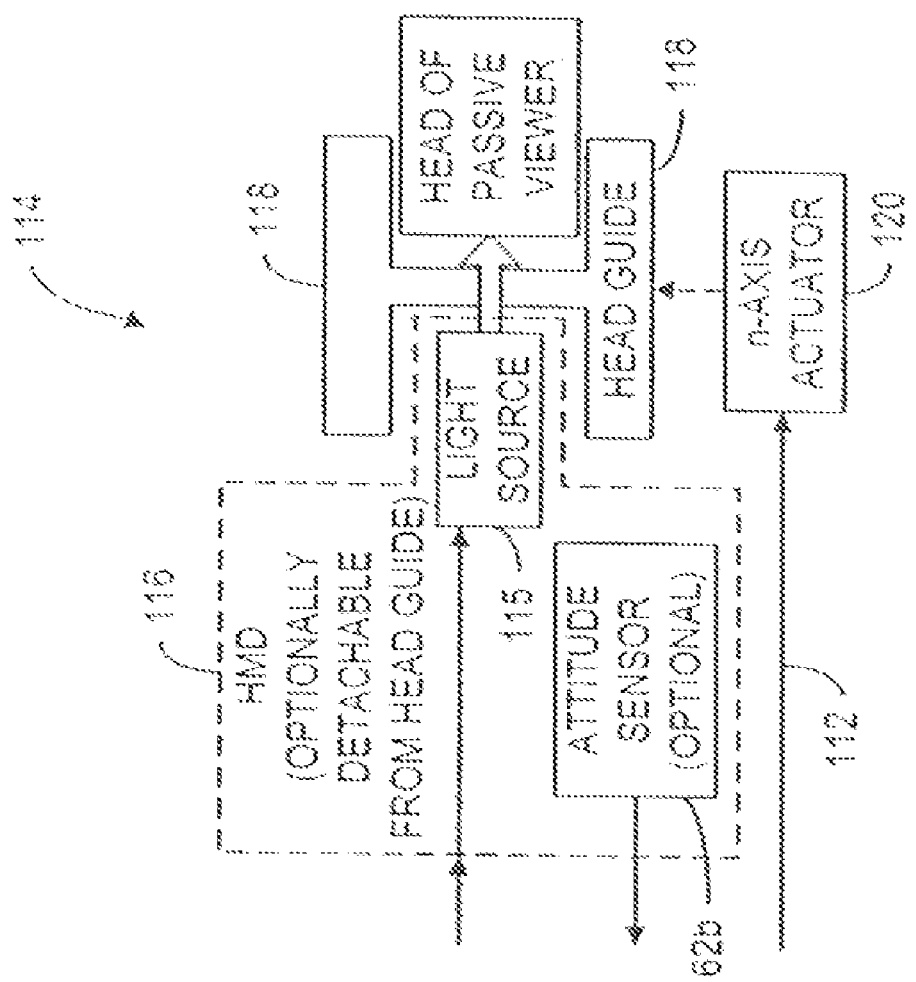
FIG. 4 shows one type of display for use by a passive viewer, according to the present invention.

Considering the foregoing, the systems of FIGS. 2-4 can be used in a communication network application such as, but not limited to, the internet. A user of one of the HMDs 56, 58, 60 can contact his internet service provider 42 using an internet browser and access the internet service provider 80 for gaining control of one of the cameras 90, 91, 92 for the purpose of remote viewing. These cameras can be located in different locations such as the factory, warehouse and loading dock of the prior art mentioned above in connection with FIG. 1. However, given the wide bandwidth capabilities now becoming available, the cameras could be located in places that would have wide appeal to the general public such as tourist sites, educational settings, entertainment performances, or the like.

A conventional display 128 responsive to a signal on a line 130 from an interface 132 can be used instead of the HMD 56 or the device such as shown in U.S. Pat. No. 5,436,638. An attitude sensor or a conventional input device such as a mouse, joystick or the like 134 can be used, or a sensor such as shown in U.S. Pat. No. 5,436,638, to provide an upstream control signal on a line 136 to the interface 132. The interface 132 interchanges a bidirectional signal on a media line 138 with a wideband internet service provider 140 connected to the internet 76 by a line 142.

The wideband internet service provider 80 could own and operate the remotely located cameras and provide internet access to the various active viewers of FIG. 2 through a web page of the provider 80. Or the provider 80 could allow other owners of such cameras or other reality engines to hookup and provide video services to the various active and/or passive users through his web page. Such a wideband internet service provider could become a provider of specialized video services such as remote tourism. A problem with such a remote tourist site is that the demand for active control of a given camera, such as located at Niagara Falls, could become very high. In that case, the web page of the WISP 80 can give the user intending to use a particular site a choice: active or passive. If the camera at the desired site is not presently in use, then the intending user can choose the active option with his input device and take control of the remote camera by means of one of the attitude sensors 62, 64, 66 or the control device 134 of FIG. 2. But if the camera at the desired site is presently in use, the apparatus 114 of FIGS. 3 or 4 becomes very useful because the user can opt to be a passive viewer. In that case, the control signal provided for instance by the active user of the HMD 56 to the n-axis camera platform 100 also has another role, i. e., to control the n-axis actuator The actuator 120, in response to the signal on the line 112, causes the head guide to execute n-axis motions in emulation of the n-axis motions of the n-axis platform 100 executed in response to the signals on the line 94. Both the control signals on the lines 112 and 94 are derived from the sensed signal on the line 68 from the head attitude sensor 62. In the case of the remote camera, it is caused to execute attitudinal motions emulative of the commands of the remote user from the head attitude sensor 62. In the case of the apparatus 114, it is also caused to execute attitudinal motions emulative of the commands of the remote user from the head attitude sensor 62. Moreover, the video signals provided by the camera 90 via the internet 76 are provided to both the HMD 56 for viewing by the active viewer and to the light source 115 of the apparatus 114 for viewing by the passive viewer. It should be realized that although the attitudinal command signals for controlling the actuator 120 have been described as coming from the sensor 62, they could be sent first to the video server 82 for repackaging and sent to the apparatus 114 along with the video signals by the server 82.

Figure 5:
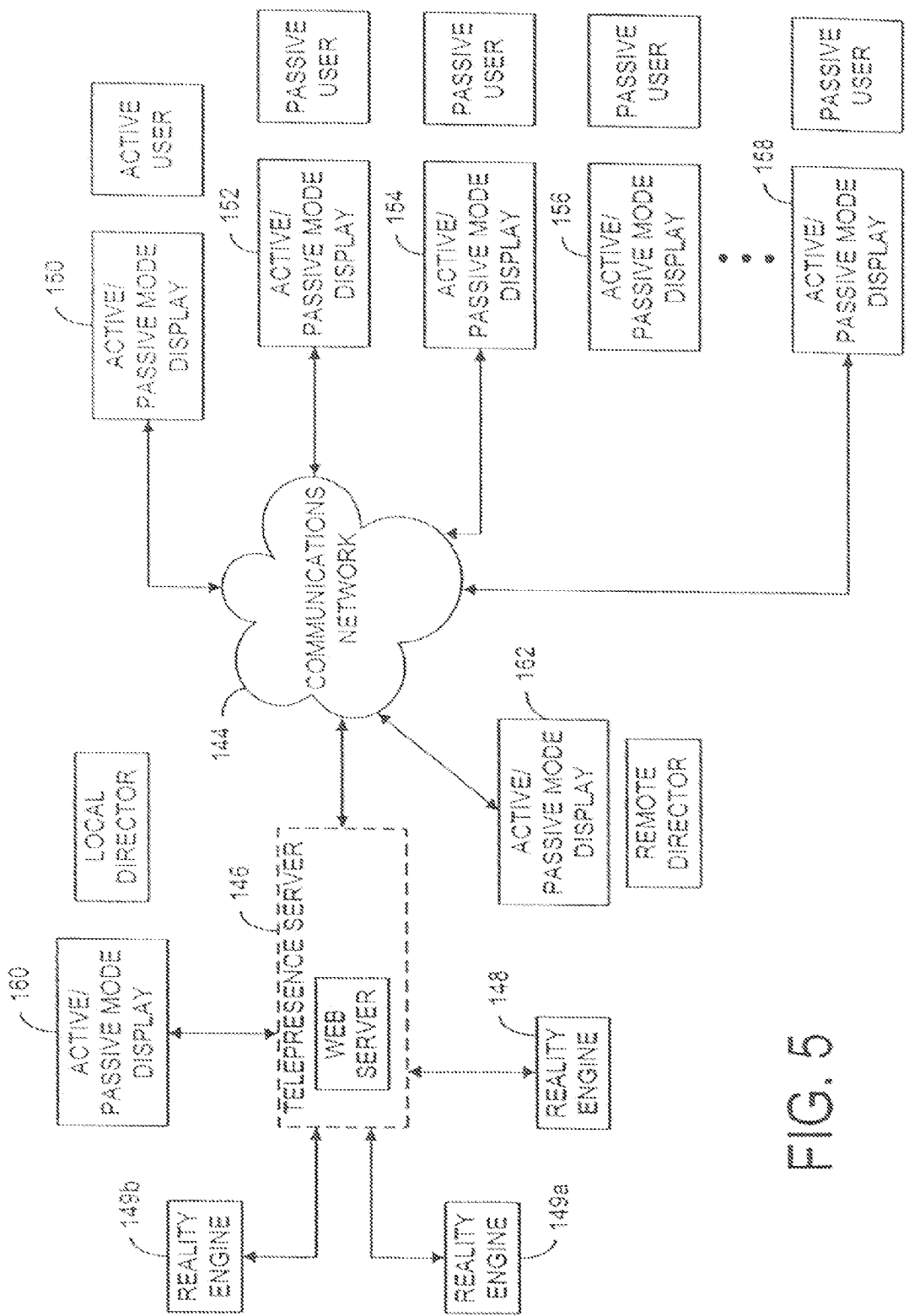
FIG. 5 shows a telepresence server with a reality engine under the control of an active user, a local director, or a remote director and a plurality of passive users all interconnected by a communications network.

FIG. 5 shows a communications network 144 connected to a telepresence server 146 with a web server connected to a plurality of generalized reality engines 148, 149a, 149b. The reality engine 148, e.g., can be one or more "live" cameras on n-axis platforms or prerecorded "virtual reality" programs. A display 150 under the control of an active user is shown in FIG. 5, as described above. The active user can access a webpage of the telepresence server 146 and, if not being used, seize control of the reality engine as described above with the display 150. Subsequent users who can each be at different geographic locations and who want to use the reality engine cannot be active users but can be passive users using displays 152, 154, 156, . . . , 158. As an alternative to the display 150 under the control of an active user drawn from the general public, the operator of the telepresence server 146 can use the services of a professional local director using a display 160 actively or a professional remote director using a display 162 actively who accesses the server through the network.

It should be realized that the displays need not be the versatile active/passive displays described here. The displays 150, 160, 162 can be designed to be useable purely as active displays such as the display shown in U.S. Pat. No. 5,436,638 to Bolas et al. Likewise, the displays 152, 154, 156, . . . , 158 can be designed to be useable purely as passive displays such as the various displays shown in co-pending U.S. patent application Ser. No. 08/794,122 filed Feb. 3, 1997, now U.S. Pat. No. 6,181,371, or even the simple conventional monitor 128 of FIG. 2. However, selectable active/passive displays are preferred for the reasons explained above.

Figure 6:
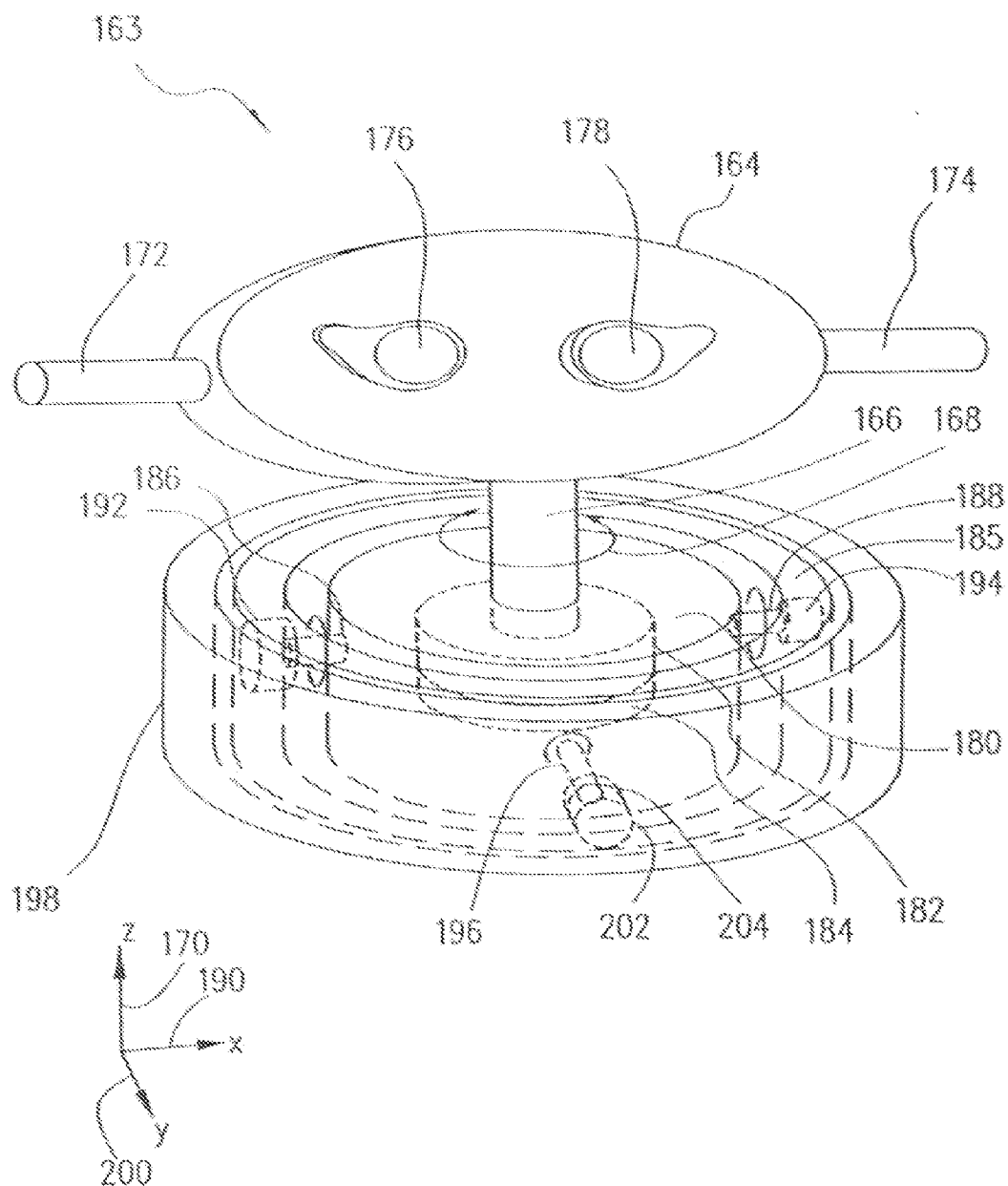
FIG. 6 shows a three-axis display that is usable in an active mode or a passive mode.

It should also be realized that the selectable mode (active/passive) display does not have to include a detachable helmet mounted display for use when the active mode is selected. For instance, FIG. 6 shows a selectable mode (active/passive) device 163 wherein a display 164 is attached to a shaft 166 that is rotatable 168 about a vertical z-axis 170 in both modes. The user places his hands on hand grips 172, 174 and places his eyes on display viewports 176, 178. The shaft 166 is rotatably mounted in a first platform part, e.g., a disc 180 and is driven in the passive mode by a yaw motor 182 that is fixed to the disc 180. In the active mode, rotations about the z-axis are measured by a yaw sensor 184. The disc 180 is rotatably mounted within a second platform part, e.g., an inner annulus 185 on a pair of pins 186, 188 in the inner annulus for rotating the about an x-axis 190. One end of the pin 186 is fixed in the disc 180 while the other end is journaled in a bearing for being rotatably driven by pitch motor 192 fixed to or in the inner annulus. The pitch motor 192 drives one of the pins 186 as a drive shaft about the x-axis to pitch disc 180 and the display 164 forward or backward in the passive mode. A pitch sensor 194 mounted in or on the inner annulus 185 senses rotation of the disc 180 about the x-axis in the active mode while the pitch motor is inactive. One pin 196 is shown of a pair of pins fixed in the inner annulus but journaled on bearings in a third platform part, e.g., an outer annulus 198 for rotating the inner annulus about a y-axis 200. A roll motor 202 is fixed on or in the outer annulus 198 and drives the pin 196 as a drive shaft to rotate the inner annulus about the y-axis in the passive mode. A roll sensor 204 is fixed in or on the outer annulus and senses rotation of the inner annulus about the y-axis in the active mode while the roll motor is inactive. It should be realized that the sensors can be used in the passive mode as well to provide feedback signals for controlling the motors in closed loop fashion. If not used in this way, the attitude of the display in passive mode can be controlled in open loop fashion.

Figure 7:
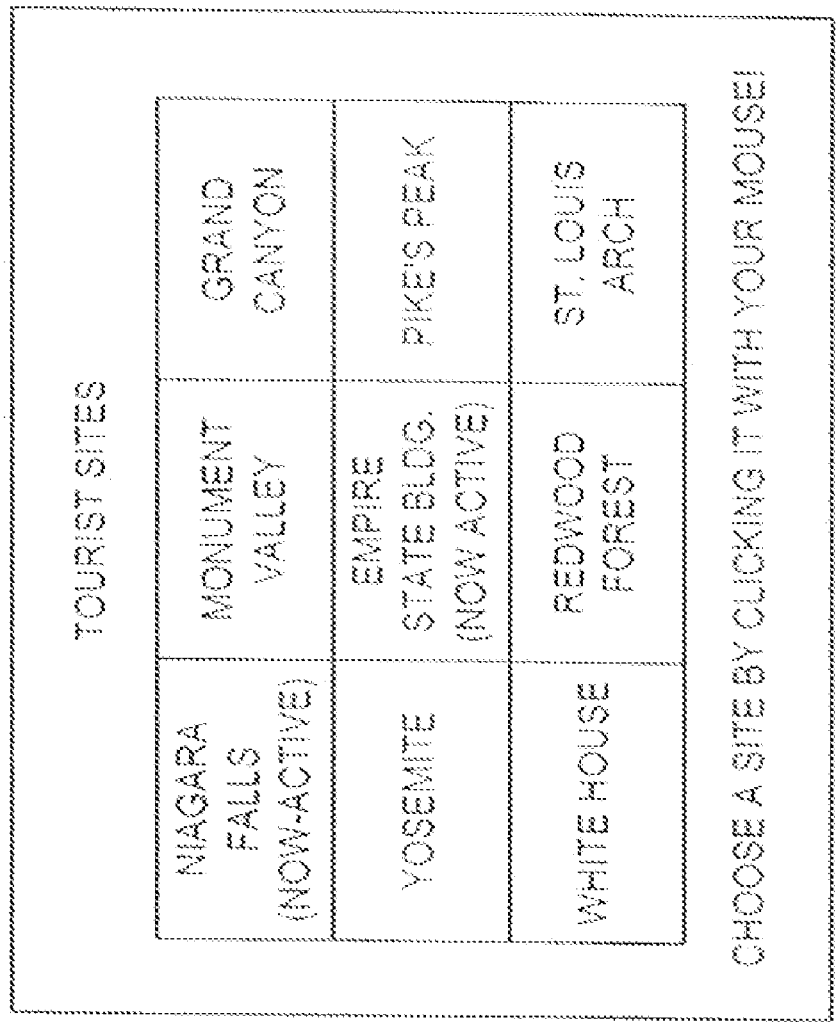
FIG. 7 shows a monitor screen where a user can choose a reality engine located at a remote tourist site for remotely viewing the chosen site.
Figure 8:
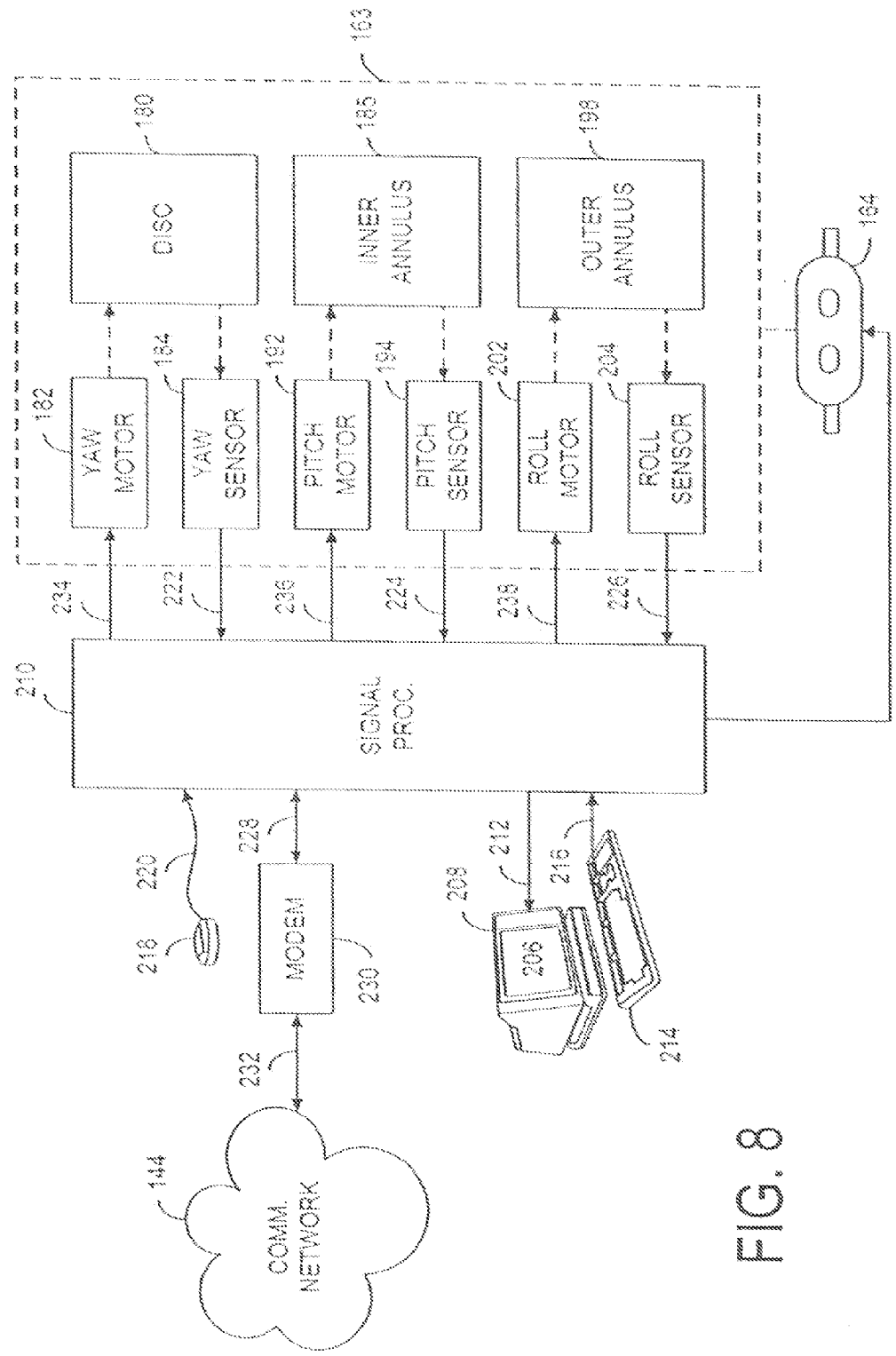
FIG. 8 shows the three-axis display such as shown in FIG. 6 in schematic block diagram form connected to the communications network of FIG. 5 via a signal processor.

FIG. 7 shows a screen 206 of a monitor 208 shown in FIG. 8 connected to a signal processor 210 by a line 212 that drives the monitor. A keyboard 214 is connected to the processor by a line 216. An intending user uses a mouse 218 connected by a line 220 to the processor to select, for example, one of the tourist sites shown in FIG. 7. The screen 206 shows nine available sites, most of which are inactive but two of which are "now active." One of the inactive sites such as the Grand Canyon can be selected with the mouse and the user is then able to use the display 164 of FIGS. 6 and 8 in an active way. In that case, the motors 182, 192, 202 are inactive while the sensors 184, 194, 204 are used to indicate the present yaw, pitch and roll, respectively, of the display 164 by providing a sensed yaw signal on a line 222, a sensed pitch signal on a line 224, and a sensed roll signal on a line 226. The signal processor 210, in response to the sensed signals on the lines 222, 224, 226, provides an output signal on a line 228 to a modem 230 which in turn provides the sensed signals on a line 232 to the communications network 144 and on to the reality engine 148 of FIG. 5 via the telepresence server 146. The server sends the sensed yaw, pitch and roll signals to the reality engine such as a 3-axis camera platform such as the platform 100 of FIG. 3 located at the Grand Canyon. A camera on the platform such as the camera 90 provides an image signal on the line 94 back to the communications network 144 and on to the display 164 through the signal processor 210. In this way, the device 163 of FIG. 8 is used like the display 150 used in active mode by an active user.

On the other hand, the user can instead use the mouse 218 to select one of the more popular sites that is already under active control indicated by "(now active)" such as Niagara Falls. In that case, the telepresence server 146 and reality engine 148 are responsive to the already active user's actions for causing images to be gathered from attitudes dictated by the active user and for providing the gathered images and the sensed yaw, pitch and roll signals to the device 163 for use in a passive way. In other words, the communications network 144 provides the gathered images and sensed yaw, pitch and roll signals from the device 150 used in an active way and provides them on the line 232 to the modem 230 which in turn provides them to the processor 210 for display on the display 164 and for controlling the yaw, pitch and roll motors by control signals on lines 234, 236, 238 for controlling the device 163 and hence the attitude of the display 164. In this way, a camera and associated platform at a popular site can be used by more than one user although only one is active. The same principle applies to accessing any kind of popular reality engine (such as preprogrammed "virtual reality" scenarios) which might otherwise be inaccessible because of high demand.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

The invention claimed is:

1. Method, comprising:
providing from a server, in response to a reality engine selection signal received over a telecommunications network from an active user, a video signal from among a plurality of reality engines selectable by said active user, said video signal video information for viewing in various attitudes controlled by one or more sensed signals provided by one or more corresponding rotation sensors of a mechanically rotatable display controlled in mechanical rotations by said active user in viewing said video information in said various attitudes, and
said server providing the video signal selected by the active user via said telecommunications network to the mechanically rotatable display controlled in said mechanical rotations by said active user for said viewing in various attitudes by said active user, wherein said reality engine selected by said active user is also selectable by selection signals from a plurality of passive users of a corresponding plurality of mechanically rotatable displays responsive to said video signal and to an actuation signal provided by said server over said telecommunications network for mechanically actuating said plurality of mechanically rotatable displays of passive users in mechanical rotations emulative of said mechanical rotations controlled by the active user for viewing said video information by said passive viewers in emulation of said active viewer in viewing said video information in said various attitudes.

2. The method of claim 1, wherein any one of said plurality of users is able to control said reality engine as said active user, that is, by providing said control signal for controlling said reality engine and, alternatively, to use said reality engine as a passive user, that is, without providing said control signal for controlling said reality engine.

3. The method of claim 1, wherein said mechanically rotatable display comprises:
an n-axis display platform, responsive in a passive mode to said actuation signal, for mechanically guiding a head of a passive user to execute said mechanical rotations, and responsive in an active mode to rotational control movements of an active user for providing sensed signals indicative of said rotational control movements; and
a display connected to said n-axis display platform, responsive to a video signal, for displaying images corresponding to said mechanical rotations in said passive mode or to said rotational control movements in said active mode.

4. The method of claim 3, wherein said n-axis display platform comprises:
a first platform part rotatable about a first axis and upon which said display is mounted;
a second platform part within which said first platform part is rotatably mounted for rotation about a second axis; and
at least one of a first motor and first sensor fixed in or to said first platform part for rotationally driving and sensing rotations, respectively, of said first platform part about said first axis.

5. The method of claim, wherein said n-axis display platform further comprises a third platform part within which said second platform part is rotatably mounted for rotation about a third axis.

6. The method of claim 1, wherein said control signal is provided over said network by a remote director user for remotely controlling said reality engine.

7. The method of claim 6, wherein users selecting said remotely controlled reality engine controlled by said remote director user do not provide said control signal and are therefore only passive users of said remotely controlled reality engine.

8. The method of claim 1, wherein said control signal is provided by a local director user for locally controlling said reality engine.

9. The method of claim 8, wherein users selecting said locally controlled reality engine controlled by said local director user do not provide said control signal and are therefore only passive users of said locally controlled reality engine.

10. Apparatus, comprising:
a reality engine for providing a video signal in response to a control signal received over a telecommunications network from a mechanically rotatable display of an active user, said video signal containing video information for viewing in various attitudes controlled by said control signal, said control signal comprising one or more sensed signals provided over said telecommunications network to said reality engine by one or more corresponding rotation sensors of said mechanically rotatable display controlled in mechanical rotations by said active user in viewing said video information in said various attitudes, and
a server, responsive to said video signal and to said control signal from said mechanically rotatable display for providing an actuation signal and responsive to selection signals from a plurality of users via said telecommunications network, for providing said video signal to said mechanically rotatable display of said active user and also to a plurality of mechanically rotatable displays of said plurality of users via said telecommunications network, said plurality of mechanically rotatable displays responsive to said video signal and to said actuation signal provided by said server over said telecommunications network for executing mechanical rotations emulative of said mechanical rotations controlled by said active user for viewing said video information by said plurality of users in passive emulation of said active user in viewing said video information in said various attitudes.

11. The apparatus of claim 10, wherein at least one of said plurality of mechanically rotatable displays of said plurality of users comprises:
an n-axis display platform, responsive in a passive mode to said actuation signal, for mechanically guiding a passive user's head to execute said mechanical rotations, and responsive in an active mode to attitudinal movements of a head of said active user for providing said one or more sensed signals; and
a display connected to said n-axis display platform, responsive to said video signal, for displaying images corresponding to said attitudinal movements.

12. The apparatus of claim 11, wherein said n-axis display platform comprises:
a first platform part rotatable about a first axis and upon which said display is mounted;
a second platform part within which said first platform part is rotatably mounted for rotation about a second axis; and
at least one of a first motor and first sensor fixed in or to said first platform part for rotationally driving and sensing rotations, respectively, of said first platform part about said first axis.

13. The method of claim 12, further comprising a third platform part within which said second platform part is rotatably mounted for rotation about a third axis.

14. The apparatus of claim 10, wherein said control signal can come from any one of said plurality of users any one of which is also able to use said reality engine as a passive user, that is, without providing said control signal for controlling said reality engine while another user of said plurality of users provides said control signal.

15. Apparatus, comprising:
means, responsive to a control signal received over a telecommunications network, for providing a video signal and, said control signal for controlling video information contained in said video signal for viewing in various attitudes, said control signal comprising one or more sensed signals provided by one or more corresponding rotation sensors of a mechanically rotatable display controlled in mechanical rotations by an active user in viewing said video information in said various attitudes; and
means, responsive to said video signal and to said control signal for providing an actuation signal, for providing said video signal via said telecommunications network to said mechanically rotatable display of said active user and also to a plurality of mechanically rotatable displays of a plurality of passive users via said telecommunications network, said plurality of mechanically rotatable displays of said plurality of passive users responsive to said video signal and to said actuation signal provided over said telecommunications network for executing mechanical rotations emulative of said mechanical rotations controlled by said active user for viewing said video information by said passive users in emulation of said active user in viewing said video information in said various attitudes.

16. The apparatus of claim 15, wherein at least one of said plurality of passive users is also able to use said reality engine as an active user, that is, by providing said control signal for controlling said reality engine and, alternatively, to use said reality engine as a passive user, that is, without providing said control signal for controlling said reality engine.

17. The apparatus of claim 16, wherein at least one of said plurality of mechanically rotatable displays comprises:
  an n-axis display platform, responsive in a passive mode to said actuation signal, for mechanically guiding a users head to execute said mechanical rotations, and responsive in an active mode to control movements of a user for providing said sensed signal indicative of said control movements; and
  a display connected to said n-axis display platform, responsive to said video signal, for displaying images corresponding to said mechanical rotations or control movements.

18. The apparatus of claim 17, wherein at least one of said plurality of mechanically rotatable displays further comprises hand grips for use by said user in providing said control movements.

19. The apparatus of claim 18, wherein at least one of said plurality of mechanically rotatable displays comprises display viewports on said display for use by a user in placing eyes thereon for viewing said video information.

20. The apparatus of claim 17, wherein said n-axis display platform comprises:
  a first platform part rotatable about a first axis and upon which said display is mounted;
  a second platform part within which said first platform part is rotatably mounted for rotation about a second axis;
  at least one of a first motor and first sensor fixed in or to said first platform part for rotationally driving and sensing rotations, respectively, of said first platform part about said first axis; and
  a third platform part within which said second platform part is rotatably mounted for rotation about a third axis.

* * * * *